Patented Feb. 14, 1933

1,897,039

UNITED STATES PATENT OFFICE

WALTER G. CHRISTIANSEN, OF BLOOMFIELD, NEW JERSEY, WILLIAM S. JONES, OF BROOKLYN, NEW YORK, AND EUGENE MONESS, OF NEW YORK, N. Y., ASSIGNORS TO E. R. SQUIBB & SONS, OF NEW YORK, N. Y., A CORPORATION OF NEW YORK

METHOD OF OBTAINING VITAMIN CONCENTRATES FROM FATS

No Drawing.   Application filed September 7, 1928. Serial No. 304,620.

Our invention relates to vitamin concentrates from various fats, for example cod-liver-oil, such concentrates being convenient means of administering the fat-soluble vitamins, by reason of the distastefulness and other undesirable properties of the media in which these dietetic factors are found in nature.

It is the object of our invention to provide a method whereby there may be efficiently obtained from fats a fraction containing the vitamins thereof in a relatively small mass.

Essentially our process consists in saponifying the fat with an excess of alkali, precipitating with a salt of aluminum, filtering, and evaporating the filtrate. To reduce the inert content further, the residue may be alkali-refined (that is, treated with an alkali to neutralize free fatty acids and, by means of the sludge thus formed, to carry down other inert materials, including glycerin). The excess of alkali precipitates aluminum hydroxide, which in turn causes the aluminum soap to form as a flocculent precipitate rather than as a viscous lump difficult to filter off, wash, and otherwise manipulate, and which also serves the purpose of retarding and diminishing the hydrolysis of the aluminum soap.

At the precipitation of the aluminum soap, some fatty acids appear in the reaction mixture owing to the tendency of the alkali soap to be converted thereinto because of the acidity of the aluminum salt; and additional fatty acids are formed by the decomposition of the precipitated aluminum soap into fatty acid and basic soap; the amount of which fatty acids is minimized by alternately neutralizing the fatty acids with more alkali and reprecipitating with more aluminum salt until the quantity of alkali solution required for neutralization reaches a constant minimum. Preferably, all steps of the process are conducted under anaeric conditions, only oxygen-free reagents are employed, the fat is alkali-saponified in the presence of alcohol and the reaction mixture thereupon heated, and the aluminum salt used is alcohol-soluble.

For example, 100 grams of cod liver oil in 800 cubic centimeters of ethyl alcohol may be saponified with 40 grams of potassium hydroxide, the solution heated to boiling, 245 cubic centimeters of a 20% alcoholic solution of aluminum chloride added, and boiling continued for half an hour. Then the reaction mixture is alternately neutralized and reprecipitated by adding the following quantities, expressed in cubic centimeters, of four-normal potassium hydroxide solution and aluminum chloride solution, respectively: 12.7 and 20.0; 5.3 and 8.4; 2.7 and 4.2; 2.0 and 4.0. While the mixture is hot, the precipitate is filtered out and pressed dry on a Buechner's funnel, boiled in 200 cubic centimeters of alcohol for half an hour, and filtered into the flask containing the first filtrate. To the combined filtrates, alcoholic alkali is added to neutralization, and then aluminum chloride solution until there is no further visible precipitation. A small water-diluted sample of the filtrate is tested with phenolphthalein for the presence of soluble soap, and if the result is negative the mixture is filtered and the filtrate evaporated to dryness on a steam-bath. The residue, weighing about 14 grams, and consisting of about 8 grams of glycerin, 5 of free fatty acids, and 1 of the unsaponifiable fraction, may be taken up in 100 cubic centimeters of olive oil and alkali-refined to remove the fatty acids and glycerin. Throughout the foregoing operations the reaction mixture is enveloped in an atmosphere of nitrogen, and reagents are used that contain no oxygen.

Within the scope of the appended claims various changes may be made in the substances treated and the reagents and procedures employed, without departing from our invention or sacrificing any of the advantages thereof.

We claim:

1. In obtaining a vitamin concentrate from fats, the step of precipitating an aluminum soap from such fats by means of an aluminum salt.

2. In obtaining a vitamin concentrate from fats, the step of precipitating an aluminum soap from such fats by means of an aluminum salt in the presence of an excess of alkali.

3. In obtaining a vitamin concentrate from fats, the steps of adding to such fats twice the quantity of alkali theoretically required for saponification, and precipitating with an aluminum salt.

4. The process of obtaining a vitamin concentrate from fats which comprises saponifying such fats in alcohol with an alkali, adding an aluminum salt, filtering, and evaporating the filtrate.

5. The process of obtaining a vitamin concentrate from fats which comprises saponfying such fats in alcohol with an alkali, adding an aluminum salt, filtering, evaporating the filtrate, and alkali-refining the residue.

6. The process of obtaining a vitamin concentrate from fats which comprises saponifying such fats with an alkali, alternately precipitating with an aluminum salt and neutralizing with alkali until the quantity of the latter required for neutralization reaches a constant minimum, filtering, and evaporating the filtrate.

7. The process of obtaining a vitamin concentrate from fats which comprises saponifying such fats in alcohol with an excess of alkali, boiling, alternately precipitating with an aluminum salt and neutralizing with alkali until the quantity of the latter required for neutralization reaches a constant minimum, filtering, and evaporating the filtrate.

8. The process of obtaining a vitamin concentrate from fats which comprises saponifying such fats in alcohol with an excess of alkali, boiling, alternately precipitating with an aluminum salt and neutralizing with alkali until the quantity of the latter required for neutralization reaches a constant minimum, filtering, evaporating the filtrate, and alkali-refining the residue, the reaction mixture being enveloped in an atmosphere of nitrogen throughout the process.

In testimony whereof we affix our signatures.

WALTER G. CHRISTIANSEN.
WILLIAM S. JONES.
EUGENE MONESS.